United States Patent [19]
Scherer

[11] Patent Number: 4,535,520
[45] Date of Patent: Aug. 20, 1985

[54] DEVICE FOR FACILITATING REMOVAL AND INSERTION OF PLUGS IN GAS JETS IN CORE MOLDING OPERATIONS

[76] Inventor: John R. Scherer, 1251 S. Reynolds Rd., Apt. 175, Toledo, Ohio 43615

[21] Appl. No.: 489,363

[22] Filed: Apr. 28, 1983

[51] Int. Cl.[3] .............................................. B23P 19/02
[52] U.S. Cl. ...................................................... 29/235
[58] Field of Search ................... 81/3.34; 29/234, 235, 29/244, 263, 270, 278, 280

[56] References Cited

U.S. PATENT DOCUMENTS

| | | | |
|---|---|---|---|
| 15,450 | 8/1900 | Callaway | 29/263 |
| 3,145,463 | 8/1964 | Hockett | 29/235 |
| 3,973,317 | 8/1976 | Gulistan | 29/235 |

FOREIGN PATENT DOCUMENTS

| | | | |
|---|---|---|---|
| 0207347 | 1/1921 | Canada | 29/270 |

*Primary Examiner*—Nicholas P. Godici
*Assistant Examiner*—Richard K. Seidel
*Attorney, Agent, or Firm*—George R. Royer

[57] ABSTRACT

The subject invention is a manually operated device used for the purpose of facilitating the process of inserting and removing temporarily placed plugs in and out respectively of gas jet openings in core molding machines, said device being comprised of a longitudinal disposed member having an insert assisting end and a removal assisting end, each adapted for such special purposes. The insert assisting end is adapted with a cylindrically shaped head that can fit in the plug's central cavity, while the removal assisting end has a cylindrical head with a slightly enlarged circular nodule on its extreme end.

1 Claim, 7 Drawing Figures

DEVICE FOR FACILITATING REMOVAL AND INSERTION OF PLUGS IN GAS JETS IN CORE MOLDING OPERATIONS

DISCUSSION OF PRIOR ART AND BACKGROUND OF INVENTION

The subject invention relates to core making machines in general and most particularly to shell type core molding machines. However, it must be emphasized that the subject invention may be employed in connection with any type of operation, whether involved in core making, or not, wherein plugs are used to temporarily fill a jet opening or similar port aand there is a corresponding need to insert and remove the plugs at frequent intervals under safe conditions. Thus, while the principles enunciated herein are applicable mainly to a wide variety of operations, the description of the invention herein will be directed to core molding machines.

The invention herein is adapted mainly in view of the above discussion, to shell type core molding machines, in addition to other types of metal casting machines. Again, it must be emphasized that while the background discussion is directed mostly to shell type molding machines, other types of molding machines may see utilization of this invention.

In general, shell type core molding machines are used for the production of molds of variable size and exacting precision. Most such shell type core molding machines are constructed in the form of an upright apparatus, with vertically disposed, rectangularly shaped heating plates having gas or electrical heating means, functioning to provide accurate and uniform heating and curing of the core member in the casting process. In most installations the heating plate is disposed at or near the rear part of the machine just posterior of the core member. While certain other types of machines have two heating plates juxtaposed just anterior and posterior of the core member, this serves to provide uniform heating of the core.

The heating plate is comprised, in turn, of a plurality of uniformly spaced jets through which ignited gas is projected outwardly, in the form of direct flames onto the core in a direction so as to heat the core to help the curing operation. Usually such flames are projected in a horizontal direction towards or on the core.

In many situations, the number of such jets disposed in the heating plate exceed the number necessary for projecting the required amount of heat onto the core for facilitating molding and curing evolutions. Alternately stated, the heating plate generally contains more flame projecting jets than are usually necessary for the purpose of heating and curing the core in the casting process. What often occurs under such circumstances is that during many specific types of molding operations more heat in the form of combustible gases is projected out over the core than is needed for the particular operation, and consequently excess heat is wasted in the process, causing thereby loss of efficiency in the process. Such a loss of heat efficiency translates into a significant measure of lost dollars in a given manufacturing operation. As an obvious corollary, any measures that can be taken to save such an excess loss of heat helps the efficiency of operation commensurately. Various methods have been utilized in the past to alleviate such excess expenditures in metal such operations.

One such method utilized is to plug a limited number of the jets' ports, usually in alternate sequence. This leaves the remaining jets to project the desired flames, thus proportionately cutting down the amount of heat drawn and projected in the form of flames on the core. It must be noted in this regard that there is no rigid methodology for plugging the jet ports, and thus it is usually an arbitrary determination as to what arrangement is utilized to select the ones to be plugged. This determination is usually a direct function of the amount of heat desired to be directed onto the core.

The method of plugging the jet ports may vary with the circumstances, but there has not been to date a manner or device employed efficiently and effectively plugging the jet ports with devices easily and readily removed with relative facility. The subject invention is conceived to alleviate these problems and provide methodology for a rapid change of plugging jet ports as each new operation dictates; and the following objects of the subject invention are directed accordingly.

OBJECTS

The following are objects of the subject invention:

It is an object of the subject invention to provide an improved device for placing and removing plugs from jets in a heating plate in a core molding machinery;

It is also an object of the subject invention to provide an improved device for plugging gas jet ports in a metal casting machine;

Another object of the subject invention is to provide a safety oriented device to help remove jet plugs used in core molding machines;

Yet another object of the subject invention is to provide an improved methodology for saving heat in the operation of core making machines;

An object of the subject invention is to provide an unique device for aiding in the safe and efficient removal of gas jet plugs;

Still another object of the subject invention is to provide an improved device for aiding in the process of blocking and unblocking gas jets in a metal casting machine;

A further object of the subject invention is to provide a heat port plugging device used in any type of operation;

Another object of the subject invention is to provide a device which facilitates the insertion and removal of gas jet plugs used in metal casting;

Other and further objects of this invention will become evident from a reading of the following description taken in conjunction with the drawings.

DRAWINGS

DESCRIPTION OF GENERAL EMBODIMENT

The subject invention is a device used to aid in the process of plugging and unplugging gas jet ports in a core making machine. In general the invention comprises a longitudinally extending member, of rigid composition, such member having on its respectively opposing ends differential means for aiding the removing and inserting of subject plugs used to block gas jets in a heating plate manifold in a core making machine. The device is provided on its longitudinal periphery with an appropriate surface configuration in order to facilitate manual grasping during the utilization thereof. On one end of the device is a reduced diameter portion having a relatively smooth external surface. This reduced diameter end functions as the insert end and is thus generally cylindrical in shape, having the same diameter throughout. The opposing end of the device is referred to as the removal end and is configured similarly to the insert end except that such removal end has an enlarged diametric portion, in the form of an abbreviated knob or nodule, relative to the reduced cylindrical shank. This latter end serves as the removal end in the process of removing the plug from the gas jet port in the manifold.

DESCRIPTION OF PREFERRED EMBODIMENT

Description of the preferred embodiment of the subject invention will entail only a description of one embodiment, as set forth below, however, it is to be understood that the scope of the subject invention is not to be considered limited to such described embodiment as other embodiments are conceived as being within the scope of the subject invention as indicated in the claims attached hereto. Moreover, in describing the following embodiment of the subject invention, the words "longitudinal central axis" will refer to that axis which extends symmetrically through the longest part of the object. The words "upper" and "lower" will refer respectively to those portions of the casting machine to which the subject invention applies as it rests on the floor. All other such vertical orientations will be directed accordingly.

Figure 1:
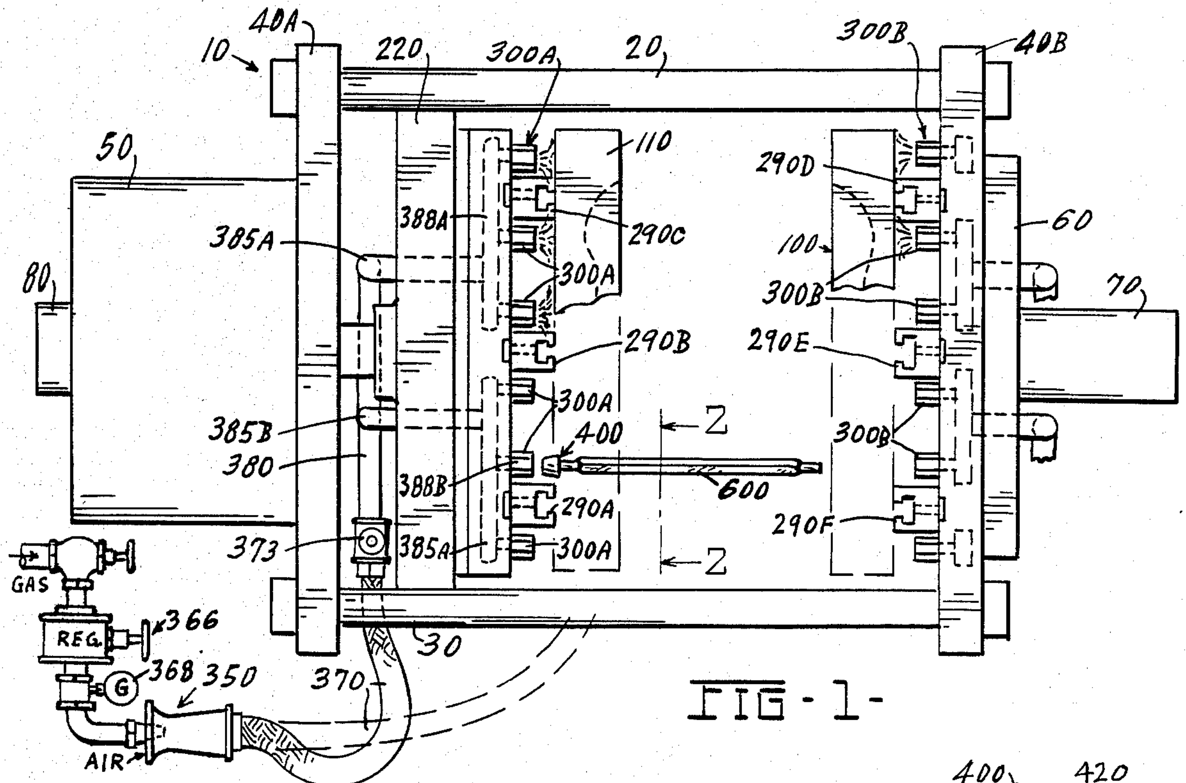
FIG. 1 is a side elevational view, in cross sectional configuration, of a core molding machine incorporating gas jets of the type to which this invention applies.

Referring now to the drawings in which a preferred embodiment is shown, and particularly to FIG. 1, a core making machine 10 is shown which incorporates heating gas jets to which the subject invention applies. In particular, shown is a core making machine 10 with integral upper and lower rod members 20 and 30 respectively. Mounted on rods 20 and 30 are end plates 40A and 40B for reciprocal sliding movement on machine 10 in a longitudinal movement. The end plate trunnion members 40A and 40B are flat plate members of generally rectangular configuration.

Mounted adjacent trunnion end plate member 40A is a ram air cylinder unit 50 functioning to move the end plate 40A in an axially sliding movement along cylindrical rod members 30 and 30 respectively towards or away from the core member, as desired. A pressure cylinder 80 is positioned on the end of such air cylinder 50, as shown. As seen in FIG. 1, integrally married in a flush position to the outer face of trunnion end plate 40B is plate 60, which in turn is joined to ejector cylinder 70 on its outer face. Mounted integrally to trunnion end plate 40A is first manifold member 200 which incorporates the gas jets of the type of which the subject invention applies. Additionally, the second manifold member 215 is incorporated into trunnion end plate 40B, as shown, and the second manifold also incorporates a plurality of gas jet members used to project flames of combustible gases on the core member or the core platens 110A and 110B, as seen in FIG. 1. Clamp members 290A, . . . 290F are utilized to secure the core in the apparatus, as required during the molding operation.

Figure 2:
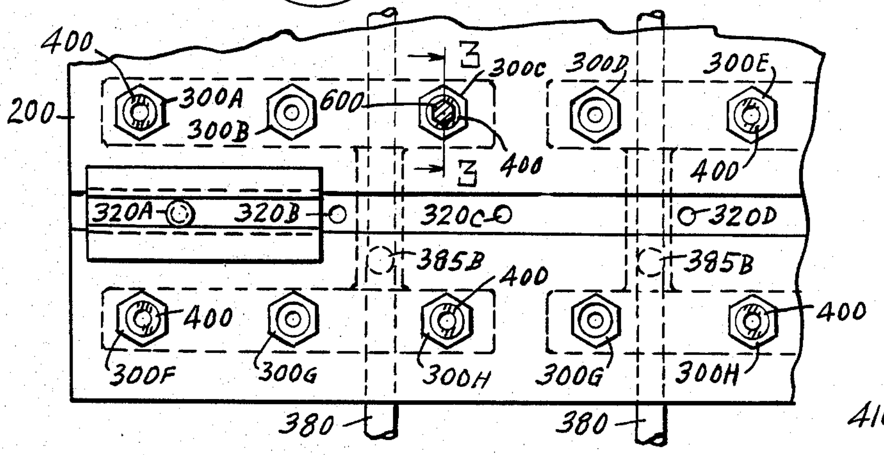
FIG. 2 is a frontal elevational view of the heating plate of a core making machine which has incorporated therein a plurality of gas jets used in the core making process.
Figure 6:
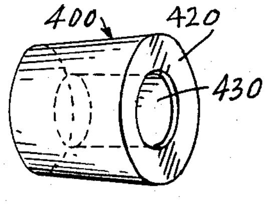
FIG. 6 is a perspective view of the jet plug showing in phantom the interior cylindrical cavity into which respective ends of the subject invention are inserted for the removal or insertion process.

Referring now to FIG. 2 in which represents a portion of the heating plate manifold 200 which shows gas jets 300A, 300B . . . 300H, and bolt means 320A, 320B . . . 320D to secure the manifold to the adjoining face plate. The gas jets are disposed in a generally evenly spaced and symmetrical manner over the manifold 200. As discussed above the gas jets 300A . . . 300H serve to deflect heat onto the heat core to facilitate the molding process and curing of the core.

Figure 3:
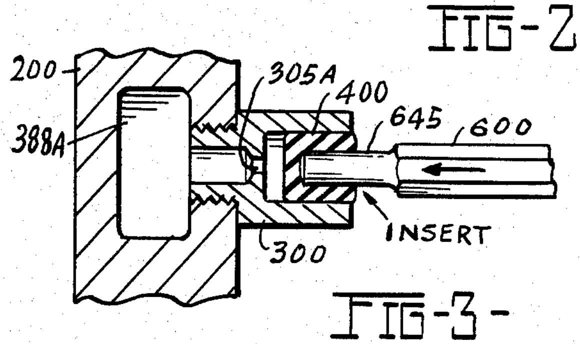
FIG. 3 is a cross-sectional view, in side elevation, of a jet shown with a blocking plug therein in the process of being inserted by the device incorporating the subject invention.
Figure 5:
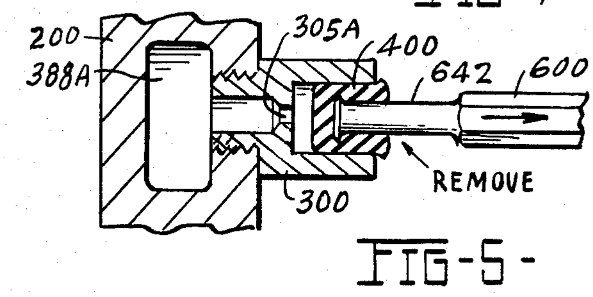
FIG. 5 is a cross sectional view, in side elevation, of a gas jet shown with a blocking plug being removed by the subject invention.

As shown in the drawings the gas jets for manifold 200 are fed gases for combustion purposes through gas lines 370 and 380 emanating through gas regulator 366, and thence into directly connected feed line 388A and 388B. In FIGS. 3 and 5, detailed views of a gas jet member 300 are represented. In particular, the jet 300, as being representative of all other such jets, has an interior restricted chamber 305A which communicates directly with a relatively enlarged chamber 309, as shown. The outer end of chamber 400 is the gas jet exit port from which the required flame is ejected, as schematically shown in FIG. 1, on the core box as described above.

Figure 7:
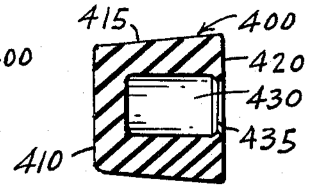
FIG. 7 is a side elevational view, in cross section, of a gas jet plug.

It is to be noted that only a portion of the manifold 200 is shown in FIG. 2, and that the manifold holds numerous other gas jet members than those shown. Additionally, the gas jets for manifold 215 will not be discussed in view of the description of the gas jets on manifold 200, since they are of a similar nature. In those cases wherein the jets 300A, 300B . . . 300H are to be plugged so as to reduce the amount of heat directed onto the core, the manner of plugging these jets may vary, but it is important in this respect that the means used be of a temporary nature so that the plugs may be either inserted or removed easily and efficiently to prepare for the subsequent molding operations. For this latter purpose, the invention herein envisions the use of a plug member 400 of rubber-like composition designed to be inserted into chamber 309 in jet 300 in order to block same. As seen, the plug 400 has a hollow chamber 430 which extends from its front face 420 just short of its end face 410, and this it extends almost the complete length of the plug 400 as shown. This plug 400 is thus adapted to fit snugly in the gas jet chamber 309 as shown. Shown in FIG. 7 is a side view of the plug member 400 which shows the precise configuration of the internal chamber 430, with a reduced neck 435 near its opening. More precisely, the cylindrically shaped chamber has a reduced neck portion 435 adjacent its open end, as shown in FIG. 7.

Once the plug 400 is inserted in jet chamber 309, as shown in FIGS. 3 and 5, the jet is effectively plugged and blocked from ejecting gaseous material. The object of such heat reducing quest is effected by such plugging, yet it is desirable to be able to remove or insert the plugs efficiently at any given time. Therefore, the subject invention as described below is adapted to facilitate this process of inserting or removing the plugs.

Figure 4:
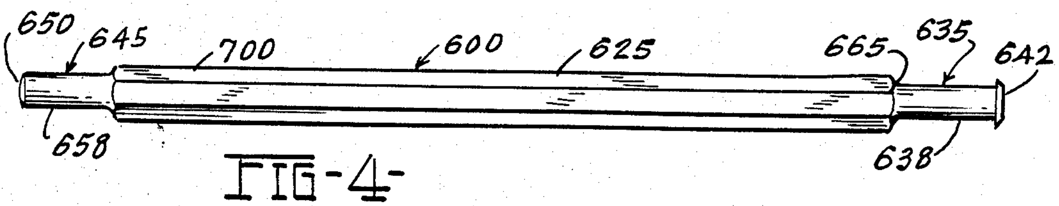
FIG. 4 is a side elevational view of the subject invention.

FIG. 4 shows a side elevational view of the preferred embodiment of the subject invention. In particular the plug insertion device, referred to for this purpose as plug insertion and removal rod 600, is a longitudinal member with a peripheral surface 625 defined by a hexagonal cross sectional configuration. It is to be noted that this precise surface configuration is optional, however some type of surface variation may be desirable in order to facilitate manual grasping during usage. The gripping surface of rod 600 extends over surface portion 625. Extending from surface portion 668 is a male insert end 645 which comprises a reduced diameter portion 658. More particularly, the insert end is a cylindrically shaped member of a diametrical extend which is smaller than the diameter of the main shank of rod 600. The insert end is preferably of regular cylindrical and smooth configuration, as shown, with a relatively abbreviated extended rounded portion 650 on its extreme end. As can be seen in FIG. 4, the insert end 645 tapers gradually from the surface portion 668 down to the reduced diameter portion 658. The regular uniform diametrical portion of male insert end 645 is thus easily inserted into the chamber 430 in plug 400, and in such posture the plug is pushed into the chamber 309 of jet 300 and then the rod 600 is pulled away once the plug is in place.

On the opposite end of rod 600, adjacent surface portion 665 is the removal end 635. The male configured removal end 635 is identical to insert end 645 in constrictional configuration except that the extreme end of removal end has an abbreviated nodule 642. More particularly, on the extreme end of removal end 642 is an enlarged diameter portion of relatively short longitudinal length. The preferred diameter of the nodule 642, while larger than the main removal member 635, is smaller than the main diameter of rod 600. The end nodule 642 is of such a diameter so as to be able to fit tightly into chamber 430 in plug 400 upon projecting such end therein with force enough to push the nodule past the restricted diameter area 435 of chamber 430 in plug 400. The nodule 642 can be emplaced, however, on any portion of the male removal member 635. Thus, when the removal end 635 of rod 600 is so inserted into chamber 430 nodule 642 catches against the reduced diameter neck 435 when the rod is pulled outwardly. This helps the rod 600 when pulled outwardly, to facilitate the removal of plug 400 from the chamber 309 in gas jet 300, as represented in FIG. 5. In converse fashion the insert end is inserted in plug chamber 430 and the plug is inserted into the gas jet chamber 309 with the assistance of rod 600, as shown diagramatically in FIGS. 3 and 5. It is not critical, in addition to note that the male insert and removal ends need not be of the same diameter and the main shank diameter.

While a limited embodiment of the subject invention has been shown it is not to be considered as limiting the scope of the following claims.

I claim:

1. A longitudinally extending tool member, with opposing first and second ends thereon, for facilitating the insertion and removal of gas jet plug members used in metal casting wherein such gas jet plug members have an open chamber, said tool member comprising:

(a) a longitudinally extending rod member having an intermediate handle portion with a base diameter, said longitudinally extending rod member having a first end and a second end;

(b) longitudinally extending insert means on the first end of said longitudinal member, said insert means being of generally cylindrical configuration, said insert means having an inner end adjacent the handle portion of said rod member and an outer end on the opposing end of said insert means, and wherein said insert means has a diameter less than the base diameter of said handle portion on said rod member, said insert means having a uniform diameter over its longitudinal extent with the extreme outer end of said insert means being rounded and;

(c) a longitudinally extending removal means on the sedond end of said rod member, said removal means having an inner end adjacent the handle portion and on outer end remote from said handle portion, said removal means being cylindrically configured with a uniform diameter less than that of said handle portion between said inner and outer ends, said removal means further comprising a circumferentially extending flange at said outer end, said flange having a taper which increases towards the inner end.

* * * * *